(12) United States Patent
Ranjan et al.

(10) Patent No.: US 10,181,039 B1
(45) Date of Patent: Jan. 15, 2019

(54) SYSTEMS AND METHODS FOR PROVIDING COMPUTING SECURITY BY CLASSIFYING ORGANIZATIONS

(71) Applicant: Symantec Corporation, Mountain View, CA (US)

(72) Inventors: Gyan Ranjan, Santa Clara, CA (US); Nikhita Koul, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 185 days.

(21) Appl. No.: 15/277,632

(22) Filed: Sep. 27, 2016

(51) Int. Cl.
 *G06F 21/57* (2013.01)
 *G06Q 30/02* (2012.01)
 *G06F 17/30* (2006.01)

(52) U.S. Cl.
 CPC ...... *G06F 21/577* (2013.01); *G06F 17/30864* (2013.01); *G06F 17/30867* (2013.01); *G06Q 30/0277* (2013.01)

(58) Field of Classification Search
 None
 See application file for complete search history.

(56) References Cited

U.S. PATENT DOCUMENTS

| 8,271,495 | B1 * | 9/2012 | Skrenta | G06F 17/30873 707/738 |
| 8,458,038 | B2 * | 6/2013 | Ando | G06F 17/30277 705/26.1 |
| 8,683,584 | B1 * | 3/2014 | Daswani | G06F 21/577 726/22 |
| 8,856,545 | B2 * | 10/2014 | Banerjee | G06F 21/00 713/188 |
| 9,842,204 | B2 * | 12/2017 | Bailey | G06F 21/46 |
| 2002/0107740 | A1 * | 8/2002 | Abiko | G06Q 30/02 705/14.69 |
| 2005/0080720 | A1 * | 4/2005 | Betz | G06Q 40/025 705/38 |
| 2006/0253580 | A1 * | 11/2006 | Dixon | G06F 21/50 709/225 |
| 2008/0109473 | A1 * | 5/2008 | Dixon | G06Q 10/06 |

(Continued)

OTHER PUBLICATIONS

Newman et al.; Statistical Entity-Topic Models; Aug. 20, 2006.

(Continued)

*Primary Examiner* — Jason Chiang
(74) *Attorney, Agent, or Firm* — Fisher Broyles, LLP

(57) ABSTRACT

The disclosed computer-implemented method for providing computing security by classifying organizations may include (1) identifying a request to classify an organization, (2) generating a web page dynamically in response to the request, the web page including content that describes the organization, (3) locating, within the web page, an advertisement that is dynamically generated by an advertisement network based at least in part on the content of the web page, (4) analyzing the advertisement to determine an organizational classification associated with the advertisement, and (5) imputing the organizational classification to the organization based at least in part on the advertisement having been dynamically generated by the advertisement network based at least in part on the content of the web page. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2009/0094697 A1* | 4/2009 | Provos | ............... | G06F 21/564 |
| | | | | 726/23 |
| 2009/0248514 A1* | 10/2009 | Pang | ............... | G06Q 30/02 |
| | | | | 705/14.54 |
| 2014/0129261 A1* | 5/2014 | Bothwell | ............... | G06Q 40/08 |
| | | | | 705/4 |
| 2014/0330594 A1* | 11/2014 | Roberts | ............... | G06Q 40/08 |
| | | | | 705/4 |
| 2015/0073929 A1* | 3/2015 | Psota | ............... | G06Q 50/28 |
| | | | | 705/26.2 |

OTHER PUBLICATIONS

Dai et al.; The Grouped Author—Topic Model for Unsupervised Entity Resolution; On or before Jun. 17, 2011.
Kataria et al.; Entity Disambiguation with Hierarchical Topic Models; On or before Aug. 24, 2011.

* cited by examiner

SYSTEMS AND METHODS FOR PROVIDING COMPUTING SECURITY BY CLASSIFYING ORGANIZATIONS

BACKGROUND

Individuals and organizations often seek to protect their computing resources from security threats and corresponding attackers. Accordingly, enterprise organizations may employ a variety of security product solutions, such as endpoint antivirus products and network firewall products. However, computing administrators within organizations and third-party security vendors may find difficulty in assessing the computing security risk profile of an organization or the optimal computing security configurations for an organization.

Unfortunately, a one-size-fits-all approach to computing security may fail to meet the various needs of organizations operating within different industries. Different organizations may have differing computing security needs, different computing infrastructures, and/or different risk profiles. Various organizations may have different security vulnerabilities, face different security threats, and/or be subject to different regulatory requirements relating to computing security. Security vendors may have difficulty providing adequate service to various organizations, particularly smaller, newer, and/or less established organizations that may be little known.

The instant disclosure, therefore, identifies and addresses a need for systems and methods for providing computing security by classifying organizations.

SUMMARY

As will be described in greater detail below, the instant disclosure describes various systems and methods for providing computing security by classifying organizations.

In one example, a computer-implemented method for providing computing security by classifying organizations may include (i) identifying a request to classify an organization, (ii) generating a web page dynamically in response to the request, the web page including content that describes the organization, (iii) locating, within the web page, an advertisement that is dynamically generated by an advertisement network based at least in part on the content of the web page, (iv) analyzing the advertisement to determine an organizational classification associated with the advertisement, and (v) imputing the organizational classification to the organization based at least in part on the advertisement having been dynamically generated by the advertisement network based at least in part on the content of the web page.

In some examples, the computer-implemented method may further include performing a security action directed to protecting a computing environment of the organization based on the organizational classification of the organization.

In some examples, performing the security action directed to protecting the computing environment of the organization based on the organizational classification of the organization may include identifying a computing security vulnerability correlated with the organizational classification.

In some examples, identifying the computing security vulnerability correlated with the organizational classification may include identifying a computing resource that is correlated with the organizational classification and determining that the computing resource may include the computing security vulnerability.

In one embodiment, the security action may include remediating the security vulnerability within the computing environment of the organization.

In one embodiment, the security action may include alerting an administrator of the computing environment of the security vulnerability.

In some examples, analyzing the advertisement to determine the organizational classification associated with the advertisement may include (i) determining that an additional organization is identified within the advertisement and (ii) determining that the organizational classification applies to the additional organization and, therefore, relates to the advertisement.

In some examples, analyzing the advertisement to determine the organizational classification associated with the advertisement may include (i) determining that an additional web page with content that describes an additional organization also includes the advertisement and (ii) determining that the organizational classification applies to the additional organization.

In some examples, analyzing the advertisement to determine the organizational classification associated with the advertisement may include (i) analyzing a group of advertisements within a group of dynamically generated web pages describing a group of organizations, (ii) generating a graph including the organizations connected by the advertisements, and (iii) analyzing the graph to determine a similarity between the organization and at least one additional organization within the graph.

In some examples, generating the web page dynamically in response to the request may include (i) identifying information describing the organization, (ii) generating a web page by creating a web page document that includes the information describing the organization and an advertisement network web element that embeds an advertisement within the web page when the web page is activated, and (iii) activating the web page.

In one embodiment, the web page includes a search result web page of a search engine and generating the web page dynamically includes searching for the organization with the search engine.

In one embodiment, a system for implementing the above-described method may include (i) an identification module, stored in memory, that identifies a request to classify an organization, (ii) a generation module, stored in memory, that generates a web page dynamically in response to the request, the web page including content that describes the organization, (iii) a locating module, stored in memory, that locates, within the web page, an advertisement that is dynamically generated by an advertisement network based at least in part on the content of the web page, (iv) an analysis module, stored in memory, that analyzes the advertisement to determine an organizational classification associated with the advertisement, (v) an imputation module, stored in memory, that imputes the organizational classification to the organization based at least in part on the advertisement having been dynamically generated by the advertisement network based at least in part on the content of the web page, and (vi) at least one physical processor configured to execute the identification module, the generation module, the locating module, the analysis module, and the imputation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a request to classify an organization, (ii) generate a web page dynamically in response to the request, the web page including content that describes the organization, (iii) locate, within the web page, an advertisement that is dynamically generated by an advertisement network based at least in part on the content of the web page, (iv) analyze the advertisement to determine an organizational classification associated with the advertisement, and (v) impute the organizational classification to the organization based at least in part on the advertisement having been dynamically generated by the advertisement network based at least in part on the content of the web page.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
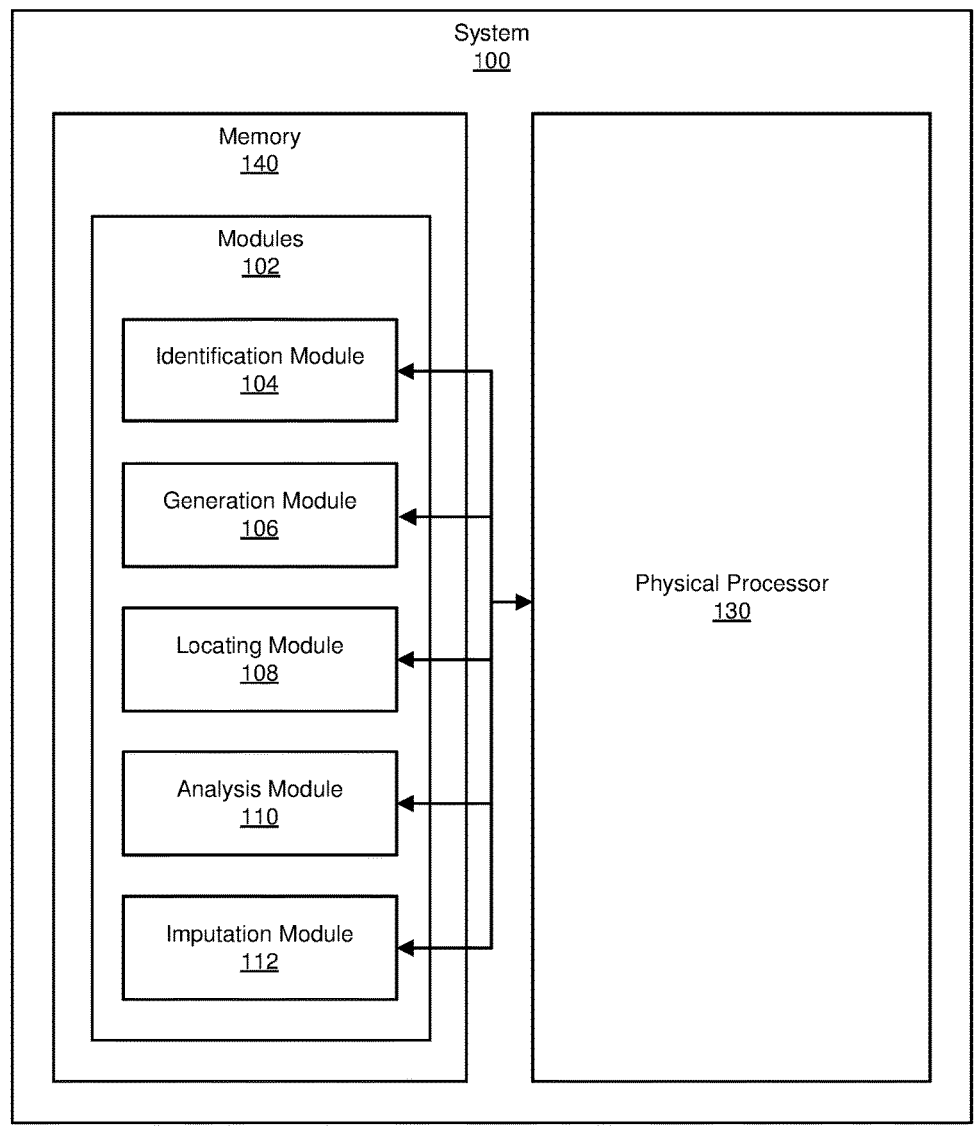
FIG. 1 is a block diagram of an example system for providing computing security by classifying organizations.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for providing computing security by classifying organizations. As will be explained in greater detail below, by generating an internet document that includes both content relating to an organization of interest and an embedded advertisement that is dynamically selected by an advertisement network based on the content, the systems and methods described herein may ascertain connections between the embedded advertisement and one or more previously classified organizations. These systems and methods may thereby impute classifications from the previously classified organizations to the organization of interest and, having classified the organization of interest, perform one or more security actions to remediate computing security vulnerabilities of the organization of interest. By informing computing security decisions for an organization in light of a classification (e.g., an industry classification), the systems and methods described herein may perform security actions that are potentially more appropriate for the organization, and thereby may address computing security vulnerabilities more efficiently and effectively.

In addition, the systems and methods described herein may improve the functioning of a computing device by improving the computing security of the computing device, by remediating a computing vulnerability of the computing device, and/or by improving the efficiency of the computing device (e.g., by utilizing a less resource-intensive security configuration where appropriate, thereby improving the performance of the computing device for primary applications; and/or by utilizing a less aggressive security configuration where appropriate, thereby blocking and/or hindering fewer functions of the computing device). These systems and methods may also improve the field of enterprise-level security by tailoring security measures to specific organizations.

Figure 2:
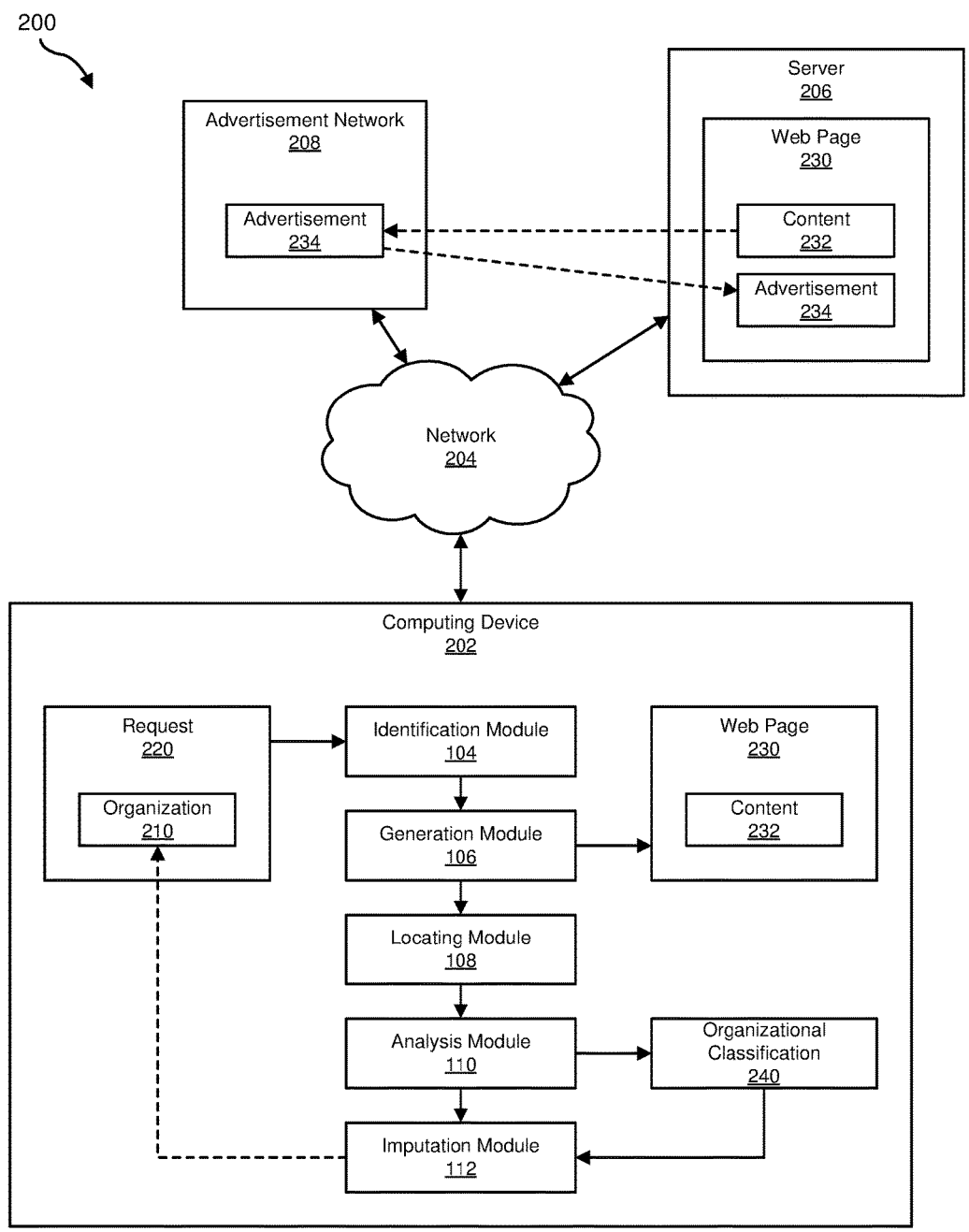
FIG. 2 is a block diagram of an additional example system for providing computing security by classifying organizations.
Figure 4:
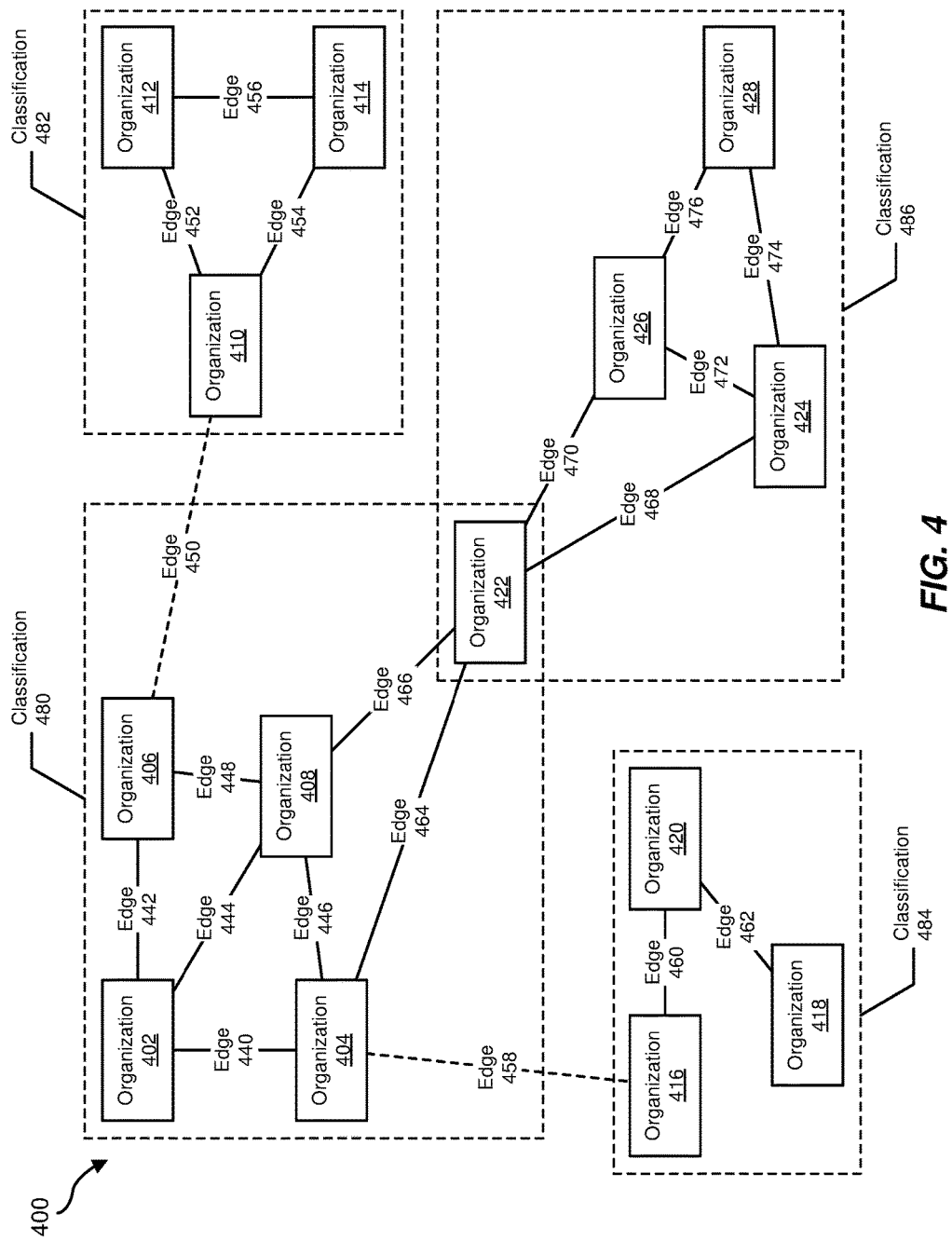
FIG. 4 is an illustration of an example graph for providing computing security by classifying organizations.
Figure 5:
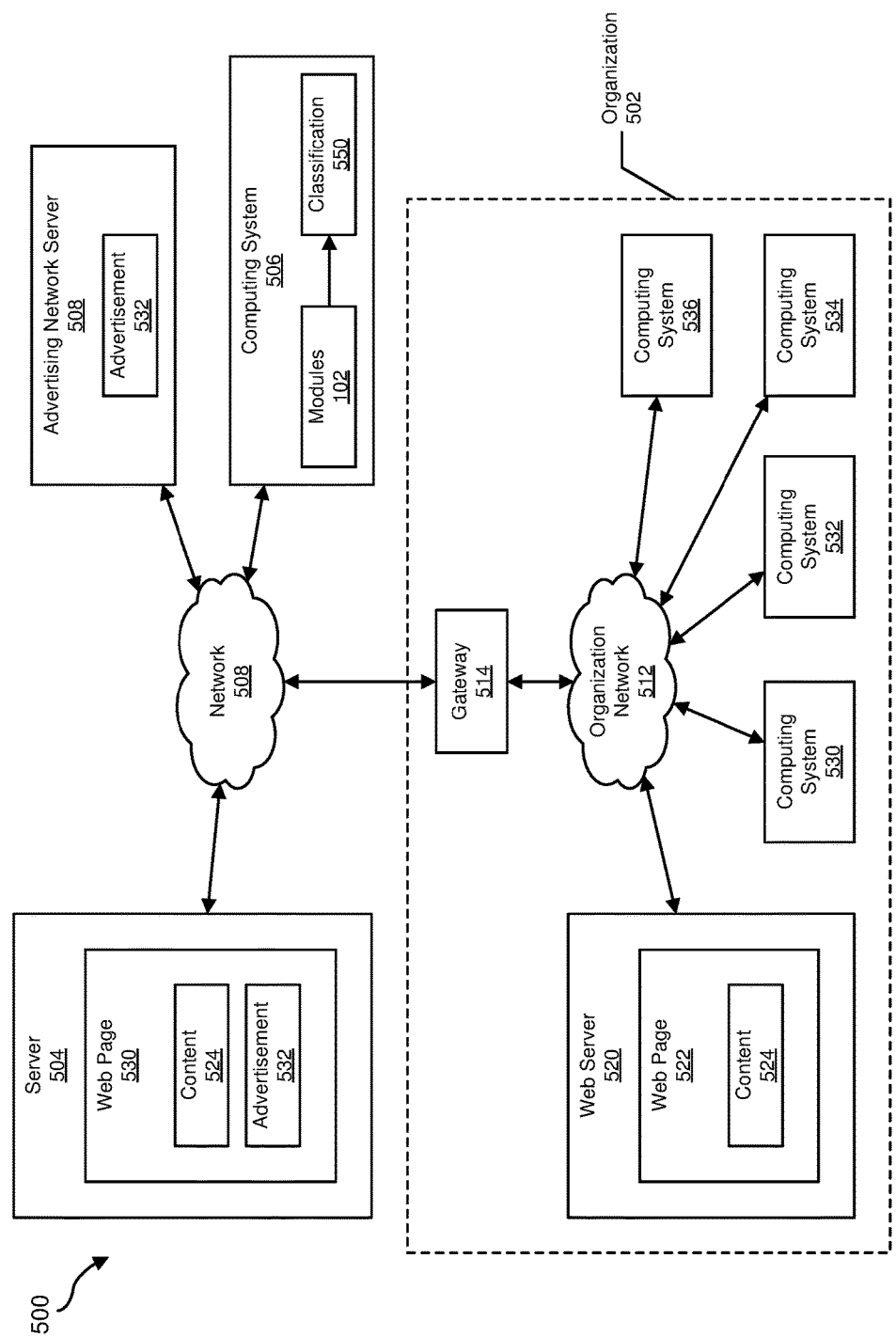
FIG. 5 is a block diagram of an example computing system for providing computing security by classifying organizations.

The following will provide, with reference to FIGS. 1, 2, and 5, detailed descriptions of example systems for providing computing security by classifying organizations. Detailed descriptions of corresponding computer-implemented methods will also be provided in connection with FIG. 3. Detailed descriptions of an example graph for providing computing security by classifying organizations will be provided in connection with FIG. 4. In addition, detailed descriptions of an example computing system and network architecture capable of implementing one or more of the embodiments described herein will be provided in connection with FIGS. 6 and 7, respectively.

FIG. 1 is a block diagram of example system 100 for providing computing security by classifying organizations. As illustrated in this figure, example system 100 may include one or more modules 102 for performing one or more tasks. For example, and as will be explained in greater detail below, example system 100 may include an identification module 104 that identifies a request to classify an organization. Example system 100 may additionally include a generation module 106 that generates a web page dynamically in response to the request, the web page that includes content that describes the organization. Example system 100 may also include a locating module 108 that locates, within the web page, an advertisement that is dynamically generated by an advertisement network based at least in part on the content of the web page. Example system 100 may additionally include an analysis module 110 that analyzes the advertisement to determine an organizational classification associated with the advertisement. Example system 100 may also include an imputation module 112 that imputes the organizational classification to the organization based at least in part on the advertisement having been dynamically generated by the advertisement network based at least in part on the content of the web page. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, server 206, and/or advertisement network 208), and/or the devices illustrated in FIG. 5 (e.g., organization network 512, gateway 514, web server 520, computing systems 530, 532, 534, and/or 536, server 504, computing system 506, and/or advertising network server 508). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate providing computing security by classifying organizations. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to provide computing security by classifying organizations. For example, and as will be described in greater detail below, one or more of modules 102 may cause computing device 202 and/or server 206 to provide computing security for an organization 210 by classifying organization 210. For example, and as will be described in greater detail below, identification module 104 may identify a request 220 to classify an organization 210. Generation module 106 may generate a web page 230 dynamically in response to request 220, web page 230 including content 232 that describes organization 210. Locating module 108 may locate, within web page 230, an advertisement 234 that is dynamically generated by an advertisement 234 network 204 based at least in part on content 232 of web page 230. Analysis module 110 may analyze advertisement 234 to determine an organizational classification 240 associated with advertisement 234. Imputation module 112 may impute organizational classification 240 to organization 210 based at least in part on advertisement 234 having been dynamically generated by advertisement 234 network 204 based at least in part on content 232 of web page 230.

Computing device 202 generally represents any type or form of computing device capable of reading computer-executable instructions. For example, computing device 202 may represent a computing system controlled by a security vendor (e.g., where the security vendor may provide and/or offer one or more security services to organization 210). Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of hosting, transmitting, receiving, rendering, relaying, and/or loading a document with an embedded advertisement. For example, server 206 may represent a web server. Additional examples of server 206 include, without limitation, security servers, application servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Advertisement network 208 generally represents any type or form of computing device that is capable of hosting, providing, injecting, selecting, loading, relaying, and/or rendering an advertisement. For example, advertisement network 208 may represent an advertisement server. Additional examples of advertisement network 208 include, without limitation, security servers, application servers, storage servers, and/or database servers configured to run certain software applications and/or provide various security, web, storage, and/or database services. Although illustrated as a single entity in FIG. 2, advertisement network 208 may include and/or represent a plurality of servers that work and/or operate in conjunction with one another.

Figure 3:
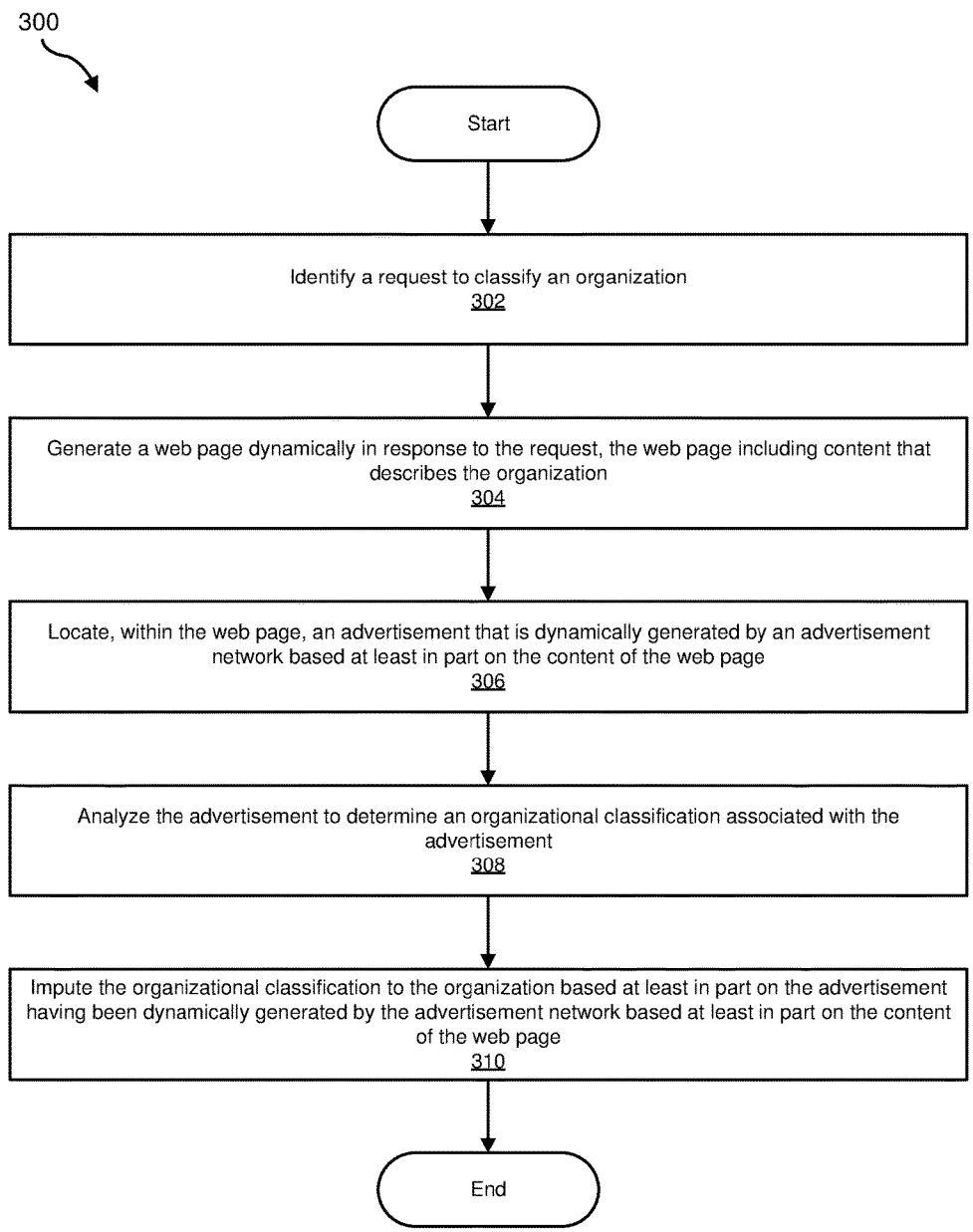
FIG. 3 is a flow diagram of an example method for providing computing security by classifying organizations.

FIG. 3 is a flow diagram of an example computer-implemented method 300 for providing computing security by classifying organizations. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a request to classify an organization. For example, identification module 104 may, as part of computing device 202 in FIG. 2, identify request 220 to classify organization 210.

The term "organization," as used herein, generally refers to any corporation, enterprise, company, business, and/or partnership that may own, control, administrate, rely upon, and/or make use of one or more computing resources. For example, an organization may own and/or operate a collection of computing systems within an enterprise network to store and/or process data relating to the organization, conduct organizational transactions, engage in organizational communications, offer and/or consume one or more computing services, etc. As will be described in greater detail below, in some examples, an organization may participate within a vertical market and/or may be classifiable as relating to one or more industries (e.g., as defined by the Standard Industrial Classification (SIC), the International Standard Industrial Classification (ISIC), and/or the North American Industry Classification System (NAICS)). However, in some examples, the organization may not yet be classified according to one or more industry classification systems (e.g., one or more of the aforementioned classification systems) in a publication and/or a distributed list (e.g., by a governmental agency and/or another interested group). For example, the organization may be relatively new and/or relatively small and may therefore lack the status that would ordinarily prompt classification by an official body.

Identification module 104 may identify the request in any of a variety of contexts. For example, the request to classify the organization may originate from a security system that protects a computing environment of the organization (e.g., so as to make improved security determinations within the computing environment). Accordingly, in some examples, identification module 104 may identify the request to classify the organization when the security system is installed, updated, and/or configured within the computing environment of the organization. In some examples, the request to classify the organization may originate from a managed security service provider that provides one or more computing security services to the organization (e.g., so as to make improved security determinations and/or security reports regarding the computing environment). In some examples, the request to classify the organization may originate from a security vendor that provides, has provided, and/or prospectively may provide one or more computing security products, services, and/or evaluations for the organization. In some examples, the request to classify the organization may originate from an administrator of a computing environment of the organization (e.g., as part of a security evaluation and/or a security audit of the organization).

Identification module 104 may identify the request in any suitable way. For example, identification module 104 may receive a message including the request from another application and/or computing system. Additionally or alternatively, identification module 104 may identify the request by identifying the organization (and, e.g., determining that the organization is to be classified). For example, identification module 104 may determine that the organization has not yet been classified (e.g., by a published classification source and/or by the systems described herein) and/or that the classification of the organization is uncertain and/or potentially incomplete and/or incorrect. In some examples, identification module 104 may search for organizations from one or more sources (e.g., governmental agency publications, industry publications, stock market listings, and/or Internet search results) and may systematically determine a classification for each organization (and/or for each of a defined subset of the organizations).

Returning to FIG. 3, at step 304, one or more of the systems described herein may generate a web page dynamically in response to the request, the web page including content that describes the organization. For example, generation module 106 may, as part of computing device 202 in FIG. 2, generate web page 230 dynamically in response to request 220, web page 230 including content 232 that describes organization 210.

The content that describes the organization may include any suitable information. For example, the content may include information that identifies the organization, such as a name of the organization (e.g., a legal name and/or a trade name), a name of a product of the organization, one or more trademarks owned by the organization, a stock exchange ticker symbol for the organization, and/or an internet domain name used by the organization. Additionally or alternatively, the content may include information that describes one or more purposes, products, services, activities, and/or relationships of the organization. In one example, the content may include a profile of the organization (e.g., that is published by the organization and/or by a third party).

The term "web page," as used herein, generally refers to any internet document and/or collection of associated internet documents whose content may be analyzed by an advertisement network and which may include an embedded advertisement whose content may be determined (e.g., on a dynamic basis) by the advertisement network based on the content of the internet document. For example, the term "web page" may refer to a hypertext document.

Generation module 106 may generate the web page in any of a variety of ways. For example, generation module 106 may generate the web page dynamically in response to the request by (i) identifying information describing the organization, (ii) generating a web page by creating a web page document that includes the information describing the organization and an advertisement network web element that embeds an advertisement within the web page when the web page is activated, and (iii) activating the web page. For example, generation module 106 may create a hypertext document and place a profile of the organization (e.g., taken from a web site of the organization) within the hypertext document. In addition, generation module 106 may insert code within the hypertext document (e.g., ORACLE JAVASCRIPT code) that retrieves an advertisement for the web page when the web page is rendered. In some examples, generation module 106 may include multiple advertisement network web elements from different advertisement networks in the web page. Generation module 106 may activate the web page in any suitable manner. For example, generation module 106 may activate the web page by rendering the web page (and, thereby, retrieving an advertisement for the web page). In some examples, generation module 106 may publish the web page in a location accessible by an advertisement network (e.g., so that the advertisement network may access the web page and analyze the content of the web page). For example, generation module 106 may publish the web page at an internet address.

In one example, generation module 106 may generate the web page by submitting a search query to a search engine. For example, the web page may include a search result web page of a search engine. Thus, generation module 106 may generate the web page dynamically by searching for the organization with the search engine (and thereby, e.g., generating a search result page via the search engine). As will be described in greater detail below, the search result page may include one or more embedded advertisements that are based on the content of the search and/or the search result page.

Returning to FIG. 3, at step 306, one or more of the systems described herein may locate, within the web page, an advertisement that is dynamically generated by an advertisement network based at least in part on the content of the web page. For example, locating module 108 may, as part of computing device 202 in FIG. 2, locate, within web page 230, advertisement 234 that is dynamically generated by advertisement 234 network 204 based at least in part on content 232 of web page 230.

The term "advertisement network," as used herein, generally refers to any entity and/or system that dynamically selects advertisements for web pages. In some examples, an advertisement network may select advertisements based on advertiser-submitted criteria. For example, an advertiser may designate one or more key words and/or subjects and the advertisement network may embed advertisements into those web pages with content that matches the corresponding key words and/or subjects. Thus, an advertiser may designate key words identifying one or more competitors, competitor products, and/or subjects that relate both to the advertiser and to similar organizations. Additionally or alternatively, the advertiser may designate subjects relating to an industry, field, and/or activity descriptive of the advertiser. In some examples, an advertisement network may select advertisements based on data mining associating the advertiser and/or the content of the advertisement with the content of the web page. For example, the advertisement network may select advertisements for web pages based on statistical analyses of key words and/or latent topics within web pages and/or consumer interactions with web pages and/or advertisements.

The advertisement may include any of a variety of data. For example, the advertisement may include textual data. Additionally or alternatively, the advertisement may include visual data (e.g., an organizational logo, an organizational trademark, a product logo and/or depiction, etc.). In some examples, the advertisement may include a hyperlink to an internet resource (e.g., a website of the advertiser, a product web page, etc.).

Locating module 108 may locate the advertisement within the web page in any suitable manner. For example, locating module 108 may parse a retrieved and/or rendered version of the web page for one or more elements that represent the advertisement. In some examples, locating module 108 may locate the advertisement based on a location within the generated web page where a web element to retrieve and/or generate the advertisement was placed (e.g., by generation module 106). In some examples, locating module 108 may simply locate content within the retrieved and/or rendered version of the web page that was not originally contributed to generate the web page (e.g., by generation module 106).

Returning to FIG. 3, at step 308, one or more of the systems described herein may analyze the advertisement to determine an organizational classification associated with the advertisement. For example, analysis module 110 may, as part of computing device 202 in FIG. 2, analyze advertisement 234 to determine organizational classification 240 associated with advertisement 234.

The term "organizational classification," as used herein, generally refers to any classification that may apply to organizations. For example, the organizational classification may include an industrial classification (e.g., according to and/or analogous to SIC, ISIC, and/or NAICS). For example, the organizational classification may indicate that the organization operates within the health care sector, the finance sector, or the public utility sector. In some examples, the organizational classification may designate more specific subsectors and/or industries, such as the hospital subsector, the electric power transmission industry, and/or the securities and commodity exchanges subsector. In some examples, the organizational classification may include one or more additional traits of an organization, such as the revenue of the organization and/or the number of members and/or employees of the organization.

Analysis module 110 may analyze the advertisement in any of a variety of ways. For example, analysis module 110 may parse and/or otherwise extract information from the advertisement to determine that another organization is identified within the advertisement. For example, analysis module 110 may identify a name of the other organization within textual data of the advertisement. Additionally or alternatively, analysis module 110 may identify an organizational logo, an organizational trademark, a product logo and/or depiction, etc., within visual data of the advertisement. In some examples, analysis module 110 may identify a hyperlink to an internet resource within the advertisement that points to a website of the additional organization and/or to a web page for describing and/or selling a product of the additional organization. In some examples, analysis module 110 may examine a domain name of the hyperlink to determine an associated organization (e.g., based on the text of the domain name and/or on registration data for the domain name that identifies the associated organization). Additionally or alternatively, analysis module 110 may follow the hyperlink and examine linked content to determine an associated organization. In some examples, analysis module 110 may analyze the advertisement to determine the organizational classification associated with the advertisement by determining that an additional organization is identified within the advertisement and determining that the organizational classification applies to the additional organization and, therefore, relates to the advertisement.

In addition to and/or instead of identifying an additional organization identified by and/or associated with the advertisement (e.g., identifying the advertiser and/or the subject of the advertisement), analysis module 110 may identify an additional organization that gives rise to, triggers, and/or induces the advertisement. In some examples, analysis module 110 may analyze the advertisement to determine the organizational classification associated with the advertisement by (i) determining that an additional web page with content that describes an additional organization also includes the advertisement and (ii) determining that the organizational classification applies to the additional organization. Thus, if a web page for another organization (with a known organizational classification) hosts the advertisement, analysis module 110 may treat the advertisement as related to the known organizational classification.

In some examples, analysis module 110 may analyze multiple advertisements within the web page from multiple advertisement networks and thereby gather organizational classification information in connection with each advertisement. In some examples, the systems described herein may generate multiple web pages for multiple organizations (e.g., a web page for each organization) and identify and analyze advertisements within each web page. In this manner, as will be explained in greater detail below, the systems described herein may relate organizational classifications between organizations via the advertisements found to be in common between the web pages of the respective organizations.

In some examples, analysis module 110 may associate one or more organizations via connections to one or more advertisements and/or one or more advertisements via connections to one or more organizations. For example, analysis module 110 may analyze the advertisement to determine the organizational classification associated with the advertisement by (i) analyzing a plurality of advertisements within a plurality of dynamically generated web pages describing a plurality of organizations, (ii) generating a graph including the plurality of organizations connected by the plurality of advertisements, and (iii) analyzing the graph to determine a similarity between the organization and at least one additional organization within the graph. For example, analysis module 110 may construct a graph of multiple organizations (e.g., as nodes). In this example, analysis module 110 may place edges between organizations based on common advertisements (e.g., a web page describing one organization yielding the same advertisement from an advertisement network as a web page describing another organization) and/or based on an organization being advertised within a web page describing another organization.

As an illustration of analysis module 110 analyzing one or more advertisements to associate organizational classifications, FIG. 4 illustrates an example graph 400. As shown in FIG. 4, graph 400 may represent various organizations as nodes. For example, graph 400 may include organizations 402, 404, 406, 408, 410, 412, 414, 416, 418, 420, 422, 424, 426, and 428. In addition, graph 400 may represent various relationships between nodes as edges. For example, graph 400 may include edges 440, 442, 444, 446, 448, 450, 452, 454, 456, 458, 460, 462, 464, 466, 468, 470, 472, 474, and 476.

In some examples, one or more of the systems described herein may generate and/or have generated a web page for each organization in graph 400. The generated web page for each organization may include content identifying and/or describing the corresponding organization. In addition, the generated web page for each organization may include one or more elements for embedding advertisements for advertisement networks. The systems described herein may then publish and render the web pages to collect information on which advertisements are presented in association with the web page generated for each organization. In response to determining web pages for two organizations displayed one or more advertisements in common and/or determining that the web page for one organization displayed an advertisement directed to another organization, one or more of the systems described herein (e.g., analysis module 110) may update graph 400 with an edge between the two organizations. In some examples, analysis module 110 may weight the edges in graph 400 according to how many advertisements are observed to connect two organizations.

For example, the systems described herein may deploy a web page that identifies and/or describes organization 402 and that includes web page elements for embedding advertisements from four different advertisement networks. These systems may also deploy a web page that identifies and/or describes organization 406 and that includes web page elements for embedding advertisements from the four different advertisement networks. Each of the four advertisement networks may examine the two web pages and select advertisements for each web page based on the respective content of the web pages. The systems described herein may then activate (e.g., load, render, and/or execute portions of) the web pages to observe which advertisements were selected for each web page. In one example, Analysis module 110 may observe that two of the four advertisements are the same and also that an advertisement on the web page for organization 406 identifies organization 402. Accordingly, analysis module 110 may identify three advertising connections between organizations 402 and 406. Thus, analysis module 110 may create and/or update edge 442 between organization 402 and 406 reflecting the advertising connections between organizations 402 and 406. In some examples, edge 442 may be weighted to reflect the number of advertising connections. In some examples, analysis module 110 may give more weight to edge 442 for the direct connection (e.g., the identification of organization 402 in the advertisement on the web page for organization 406) than for either of the indirect connections (e.g., the advertisements in common between the web pages for organizations 402 and 406).

Returning to FIG. 3, at step 310, one or more of the systems described herein may impute the organizational classification to the organization based at least in part on the advertisement having been dynamically generated by the advertisement network based at least in part on the content of the web page. For example, imputation module 112 may, as part of computing device 202 in FIG. 2, impute organizational classification 240 to organization 210 based at least in part on advertisement 234 having been dynamically generated by advertisement 234 network 204 based at least in part on content 232 of web page 230.

Imputation module 112 may impute the organizational classification to the organization in any suitable manner. For example, imputation module 112 may attribute the organizational classification based on a metric representing an association between the organization and the organizational classification meeting a predetermined threshold (e.g., based an association between the organization and the advertisement and an association between the advertisement and the organizational classification).

In some examples, imputation module 112 may use data relating to multiple organizations and/or multiple advertisements to impute the organizational classification to the organization. For example, some imputation module 112 may identify a pre-existing organizational classification applied to some organizations. Imputation module 112 may then determine how similar, in light of one or more associated advertisements and according to any of a number of statistical analyses, the organization is to those organizations with pre-existing organizational classifications. In this manner, imputation module 112 may impute an organizational classification to the organization where the organization is shown to be sufficiently related to other organizations (e.g., based on advertisements in common for web pages describing the respective organizations and/or based on advertisements on a web page for one organization referencing other organizations) with the organizational classification.

Using FIG. 4 as an example, imputation module 112 may impute one or more classifications (e.g., classification 480, 482, 484, and/or 486) to one or more of the organizations in graph 400 based on pre-existing organizational classifications of some of the organizations in graph 400 and based on one or more edges within graph 400 relating organizations to be classified and organizations already classified. In one example, organizations 402 and 408 may have a pre-existing classification (e.g., classification 480). In this example, the systems and methods described herein may receive a request to classify organization 404. Accordingly, these systems may construct graph 400 using one or more of the techniques described above and determine, based on edges 440 and 446, that organization 404 is related to organizations 402 and 408 and, therefore, may impute classification 480 to organization 404. In one example, imputation module 112 may also identify edge 458 between organization 404 and organization 416. Organization 416 may also have a pre-existing classification (e.g., classification 484). However, edge 458 may have a relatively low weight (e.g., because only one advertisement was observed to relate organization 404 and organization 416). Accordingly, imputation 112 may remove and/or disregard edge 458 and/or may determine that the cumulative relationship between organization 404 and classification 484 is too weak to impute classification 484 to organization 404. In another example, the systems and methods described herein may receive a request to classify organization 422. In this example, classification 480 may already apply to organizations 402, 404, 406, and 408 and classification 486 may already apply to organization 424, 426, and 428. Imputation module 112 may attribute classification 480 to organization 422 based on edges 464 and 466 connecting organization 422 to organizations already classified with classification 480. In addition, imputation module 112 may attribute classification 486 to organization 422 based on edges 468 and 470 connecting organization 422 to organizations already classified with classification 486. Thus, in one example, imputation module 112 may impute multiple classifications (e.g., classification 480 and 486) to organization 422. Alternatively, imputation module 112 may impute only classification 480 to organization 422 (because, e.g., edges 466 and 464 may have a stronger cumulative weight than edges 468 and 470).

In some examples, imputation module 112 may also consider organizations more than one hop away from the organization when imputing a classification to the organization. For example, imputation module 112 may classify impute a classification to organization 428 based on the classification of organization 426 (being one hop away from organization 428 by edge 476) and based on the classification of organization 424 (being one hop away from organization 428 by edge 474) but also based on the classification of organization 422 (being within two hops of organization 428 by edges 476 and 470 or edges 474 and 468). Thus, imputation module 112 may consider the classifications of organizations k hops away. In some examples, imputation module 112 may reduce the importance of organizations that are more hops away (e.g., based on the number of hops and/or based on low edge weights between hops). Accordingly, the imputation module 112 may account for the cumulative weighted contributions of existing classifications for various organizations when imputing an organizational classification to an organization.

In some examples, one or more of the systems described herein (e.g., imputation module 112) may perform a security action directed to protecting a computing environment of the organization based on the organizational classification of the organization.

The term "security action," as used herein, generally refers to any suitable action that a computing system may perform to protect a computing system and/or environment from a computing security threat and/or vulnerability and/or that may mitigate a risk that may be posed by a computing threat, computing vulnerability, and/or computing failure. Examples of security actions include, without limitation, generating and/or modifying a security report; alerting a user and/or administrator; and/or automatically performing (and/or prompting a user or administrator to perform) a remedial action such as updating an antivirus signature set, executing one or more cleaning and/or inoculation scripts and/or programs, enabling, heightening, and/or strengthening one or more security measures, settings, and/or features, reconfiguring a security system, adding and/or modifying a security rule used by a security system, and/or disabling, quarantining, sandboxing, and/or powering down one or more software, hardware, virtual, and/or network computing resources.

In some examples, the security action may include evaluating a risk level posed to the computing environment of the organization and/or posed to the organization by one or more vulnerabilities of the computing environment of the organization. In some examples, the security action may include making one or more recommendations to the organization and/or to a security vendor that provides and/or may provide one or more computing security services for the organization. For example, the security action may include a risk assessment including, e.g., an assessment of the likelihood of one or more computing performance and/or computing security failures within the organization, an expected cost of one or more computing performance and/or computing security failures within the organization, an expected residual risk to the organization given a current computing security configurations and/or one or more potential computing security configurations, and/or a recommendation for optimizing the total cost of computing security within predefined risk parameters (e.g., to solve a minimization problem including the monetary cost of each potential security configuration, the impact on computing and/or operational performance of each potential computing security configuration, and/or the residual risk to the computing environment after applying each potential security configuration). In some examples, the security action may include a recommendation to substitute residual risk with a cyberinsurance policy and/or may include an estimated cost and/or value of a cyberinsurance policy. In some examples, the security action may include a joint action of executing a security configuration within the computing environment of the organization and recommending and/or executing a complementary cyberinsurance policy (that, e.g., takes the executed security configuration into account). In some examples, the systems described herein may generate one or more elements of a recommended cyberinsurance policy (e.g., a recommended cost, a stipulated configuration of the computing environment, etc.) based on the organizational classification of the organization.

In some examples, one or more of the systems described herein (e.g., imputation module 112) may perform the security action directed to protecting the computing environment of the organization based on the organizational classification of the organization by identifying a computing security vulnerability correlated with the organizational classification.

The term "computing security vulnerability," as used herein, generally refers any exposure to one or more computing threats and/or failures. For example, a computing security vulnerability may facilitate an exploit of a computing system. In some examples, particular exploits and/or attacks on a computing system may rely on one or more particular computing security vulnerabilities to succeed.

Imputation module 112 may identify the computing security vulnerability correlated with the organizational classification in any of a variety of ways. For example, imputation module 112 may identify the computing security vulnerability correlated with the organizational classification by identifying a computing resource that is correlated with the organizational classification and determining that the computing resource by the computing security vulnerability. For example, imputation module 112 may identify software that is commonly installed within the computing environments of organizations within the organizational classification. Because, for example, organizations that share organizational classifications may share operational needs that may be filled by similar software, these organizations may be share computing security vulnerabilities. Accordingly, in some examples, imputation module 112 may perform a security action directed at remediating the computing security vulnerability (e.g., that is correlated with the organizational classification) within the computing environment of the organization. In some examples, the security action may include alerting an administrator of the computing environment (and/or a security vendor that provides security services for the computing environment) of the security vulnerability.

In some examples, one or more of the systems described herein (e.g., imputation module 112) may perform the security action directed to protecting the computing environment of the organization based on the organizational classification of the organization by identifying a computing security threat correlated with the organizational classification. For example, certain types of computing attacks may be correlated with certain types of organizations. Accordingly, imputation module 112 may perform a security action directed to protecting the computing environment of the organization against a computing security threat correlated with the organizational classification imputed to the organization.

Imputation module 112 may determine that a security vulnerability and/or a security threat is correlated with an organizational classification in any suitable manner. For example, imputation module 112 may query a database with the organizational classification and receive information about one or more security vulnerabilities and/or security threats that are correlated with the organizational classification in response. Additionally or alternatively, imputation module 112 may, operating as a part of and/or in concert with one or more computing systems deployed by a security vendor, gather information from various client organizations of the security vendor and aggregate observations of computing security vulnerabilities found within the organizations and/or security threats directed to the organizations.

To provide an example of imputation module 112 performing a security action, FIG. 5 illustrates an example system 500. As shown in FIG. 5, system 500 may include an organization 502, a web server 504, a security server 506, and an advertising network server 508. In one example, modules 102 may, as a part of security server 506 (and/or, e.g., operating within web server 504 and/or one or more of the systems within organization 502) receive a request to classify organization 502. Security server 506 may then retrieve content 524 from a web page 522 hosted by a web server 520 (based on determining, e.g., that web page 522 describes organization 502). Security server 506 may then publish, on web server 504, a web page 530 that includes content 524 and an element for embedding an advertisement from advertising network server 508. Advertising network server 508 may scan content 524 of web page 530 and select an advertisement 532 to display within web page 530 accordingly. Security server 506 may then retrieve web page 530 and, thereby, identify and analyze advertisement 532. Security server may then, based on analyzing advertisement 532 (e.g., in the context of one or more additional advertisements associated with one or more additional organizations), impute a classification 550 to organization 502. Security server 506 may then, based on classification 550, perform one or more security actions relating to organization 502 and/or an organization network 512 of organization 502. For example, security server 506 may perform one or more security actions (e.g., by communicating with a security system within organization network 512) on organization network 512, gateway 514, web server 520, and/or computing systems 530, 532, 534, and/or 536 to protect organization network 512 and/or one or more devices within organization network 512 from a computing vulnerability and/or a computing threat associated with classification 550. Additionally or alternatively, security server 506 may, based on classification 550, infer one or more traits of organization 502 and/or organization network 512 and make one or more recommendations to an administrator of organization network 512, an agent of organization 502, and/or to a security vendor regarding one or more computing security products (including e.g., one or more computing security systems, computing security services, and/or cyberinsurance products).

As explained above in connection with example method 300 in FIG. 3, the systems described herein may automatically determine the vertical of a company by looking at advertisement content embedded in search results when querying for the organization in question. For example, the systems described herein may (i) construct an identifier set for a company, including the name of the company, the stock exchange ticker symbol of the company, the internet domain host name of the company, etc., (ii) query an industrial search engine with the identifier set to obtain a list of results as well as advertisement text corpuses resulting from the search query, (iii) recursively repeating the process to construct a similarity graph between entities that figure in the search results and the related advertising, starting from the initial company of interest, and (iv) assigning the company vertical label by weighted majority vote for the entity/company of interest based on the k-hop neighborhood of the company in the constructed graph.

In one example, the systems described herein may perform a search for a company (e.g., using the name of the company) and receive search result information for the company. In some examples, the search result information may include one or more advertisements connected to other companies. In some examples, the search result information may include one or more additional terms (e.g., names of companies) searched for by other users in connection with the same company. Accordingly, the systems described herein may use "people also searched for" elements of search results to identify similar companies and construct similarity graphs and/or impute the organizational classification of one company to a similar company. In some examples, the systems described herein may, based on a peer mapping of a given company with other companies, the vertical, approximate revenue, and/or number of employees for the given company.

Figure 6:
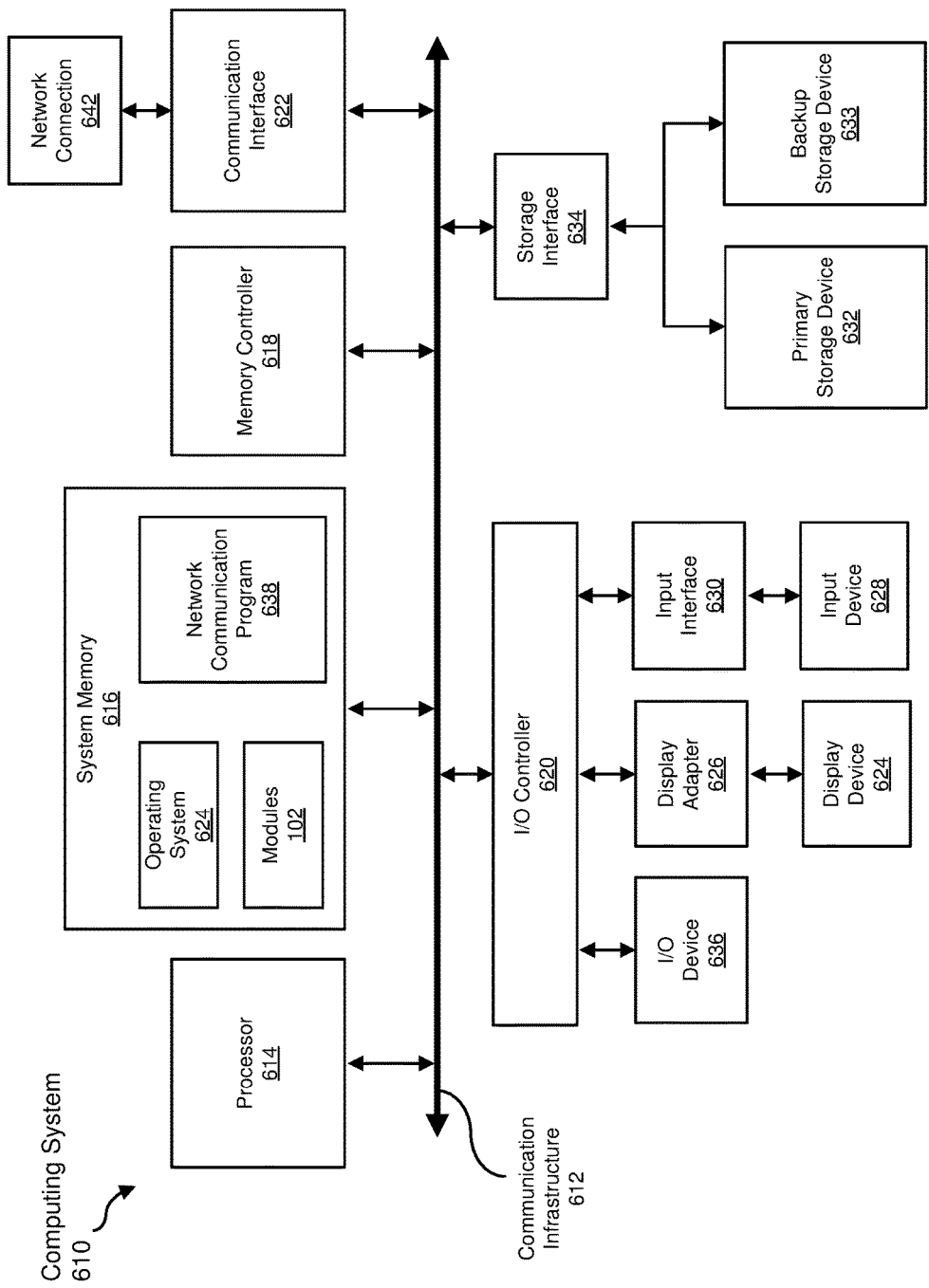
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 624 for execution by processor 614. In one example, operating system 624 may include and/or represent software that manages computer hardware and software resources and/or provides common services to computer programs and/or applications on computing system 610. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
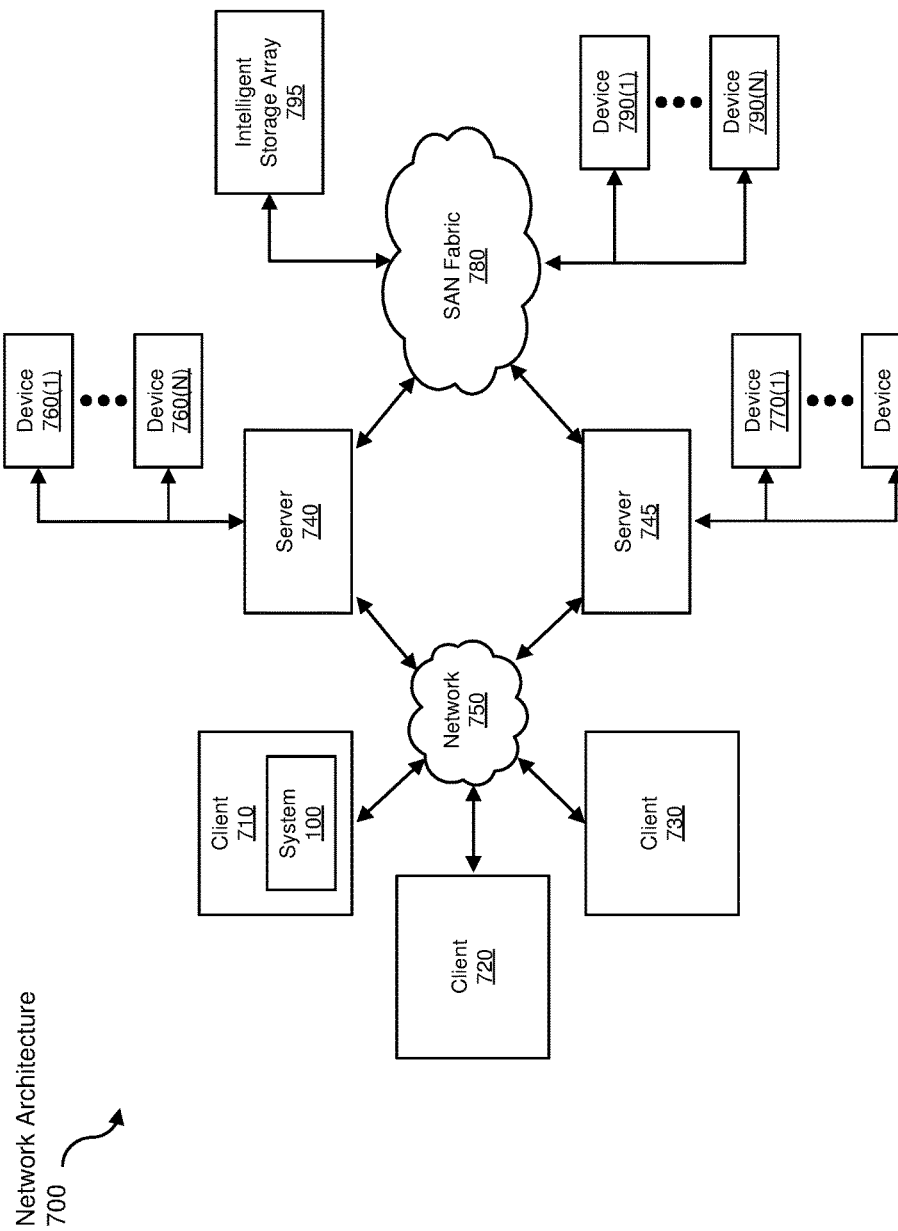
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for providing computing security by classifying organizations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive organizational information to be transformed, transform the organizational data into an internet document with an embedded advertisement, output a result of the transformation to a server, use the result of the transformation to ascertain an organizational classification and perform a security action for a corresponding organization, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing computing security by classifying organizations, at least a portion of the method being performed by a computing device comprising at least one processor, the method comprising:
   identifying a request to classify an organization;
   generating a web page dynamically in response to the request, the web page comprising content that describes the organization;
   locating, within the web page, an advertisement that is dynamically generated by an advertisement network based at least in part on the content of the web page;
   analyzing the advertisement to determine an organizational classification associated with the advertisement at least in part by:
      generating a graph comprising a plurality of organizations connected by a plurality of advertisements; and
      analyzing the graph to determine a similarity between the organization and at least one additional organization within the graph that has a pre-existing classification that corresponds to the organizational classification;
   imputing the organizational classification to the organization based at least in part on the determined similarity between the organization and the at least one additional organization within the graph that has the pre-existing classification that corresponds to the organizational classification; and
   performing a security action directed to protecting a computing environment of the organization based on the organizational classification of the organization at least in part by identifying a computing security vulnerability correlated with the organizational classification.

2. The computer-implemented method of claim 1, wherein performing the security action comprises making a recommendation to the organization.

3. The computer-implemented method of claim 1, wherein performing the security action comprises evaluating a risk level posed to the computing environment of the organization.

4. The computer-implemented method of claim 1, wherein identifying the computing security vulnerability correlated with the organizational classification comprises identifying a computing resource that is correlated with the organizational classification and determining that the computing resource comprises the computing security vulnerability.

5. The computer-implemented method of claim 1, wherein the security action comprises remediating the computing security vulnerability within the computing environment of the organization.

6. The computer-implemented method of claim 1, wherein the security action comprises alerting an administrator of the computing environment of the computing security vulnerability.

7. The computer-implemented method of claim 1, wherein analyzing the advertisement to determine the organizational classification associated with the advertisement comprises:
   determining that the additional organization is identified within the advertisement; and
   determining that the organizational classification applies to the additional organization and, therefore, relates to the advertisement.

8. The computer-implemented method of claim 1, wherein analyzing the advertisement to determine the organizational classification associated with the advertisement comprises:
   determining that an additional web page with content that describes the additional organization also comprises the advertisement; and
   determining that the organizational classification applies to the additional organization.

9. The computer-implemented method of claim 1, wherein analyzing the advertisement to determine the organizational classification associated with the advertisement comprises analyzing the plurality of advertisements within a plurality of dynamically generated web pages describing the plurality of organizations.

10. The computer-implemented method of claim 1, wherein generating the web page dynamically in response to the request comprises:
    identifying information describing the organization;
    generating the web page by creating a web page document that includes the information describing the organization and an advertisement network web element that embeds the advertisement within the web page when the web page is activated; and
    activating the web page.

11. The computer-implemented method of claim 1, wherein:
    the web page comprises a search result web page of a search engine; and
    generating the web page dynamically comprises searching for the organization with the search engine.

12. A system for providing computing security by classifying organizations, the system comprising:
    an identification module, stored in memory, that identifies a request to classify an organization;
    a generation module, stored in memory, that generates a web page dynamically in response to the request, the web page comprising content that describes the organization;
    a locating module, stored in memory, that locates, within the web page, an advertisement that is dynamically generated by an advertisement network based at least in part on the content of the web page;
    an analysis module, stored in memory, that analyzes the advertisement to determine an organizational classification associated with the advertisement at least in part by:
        generating a graph comprising a plurality of organizations connected by a plurality of advertisements; and
        analyzing the graph to determine a similarity between the organization and at least one additional organization within the graph that has a pre-existing classification that corresponds to the organizational classification;
    an imputation module, stored in memory, that:
        imputes the organizational classification to the organization based at least in part on the determined similarity between the organization and the at least one additional organization within the graph that has the pre-existing classification that corresponds to the organizational classification; and
        performs a security action directed to protecting a computing environment of the organization based on the organizational classification of the organization at least in part by identifying a computing security vulnerability correlated with the organizational classification; and
    at least one physical processor configured to execute the identification module, the generation module, the locating module, the analysis module, and the imputation module.

13. The system of claim 12, wherein the imputation module further performs the security action at least in part by making a recommendation to the organization.

14. The system of claim 12, wherein the imputation module further performs the security action at least in part by evaluating a risk level posed to the computing environment of the organization.

15. The system of claim 12, wherein the imputation module identifies the computing security vulnerability correlated with the organizational classification by identifying a computing resource that is correlated with the organizational classification and determining that the computing resource comprises the computing security vulnerability.

16. The system of claim 12, wherein the security action comprises remediating the computing security vulnerability within the computing environment of the organization.

17. The system of claim 12, wherein the security action comprises alerting an administrator of the computing environment of the computing security vulnerability.

18. The system of claim 12, wherein the analysis module analyzes the advertisement to determine the organizational classification associated with the advertisement by:
    determining that the additional organization is identified within the advertisement; and
    determining that the organizational classification applies to the additional organization and, therefore, relates to the advertisement.

19. The system of claim 12, wherein the analysis module analyzes the advertisement to determine the organizational classification associated with the advertisement by:
    determining that an additional web page with content that describes the additional organization also comprises the advertisement; and
    determining that the organizational classification applies to the additional organization.

20. A non-transitory computer-readable medium comprising one or more computer-readable instructions that, when executed by at least one processor of a computing device, cause the computing device to:
- identify a request to classify an organization;
- generate a web page dynamically in response to the request, the web page comprising content that describes the organization;
- locate, within the web page, an advertisement that is dynamically generated by an advertisement network based at least in part on the content of the web page;
- analyze the advertisement to determine an organizational classification associated with the advertisement at least in part by:
  - generating a graph comprising a plurality of organizations connected by a plurality of advertisements; and
  - analyzing the graph to determine a similarity between the organization and at least one additional organization within the graph that has a pre-existing classification that corresponds to the organizational classification;
- impute the organizational classification to the organization based at least in part on the determined similarity between the organization and the at least one additional organization within the graph that has the pre-existing classification that corresponds to the organizational classification; and
- perform a security action directed to protecting a computing environment of the organization based on the organizational classification of the organization at least in part by identifying a computing security vulnerability correlated with the organizational classification.

* * * * *